P. PROVOST.
Grain-Drier.
No. 214,189.          Patented April 8, 1879.
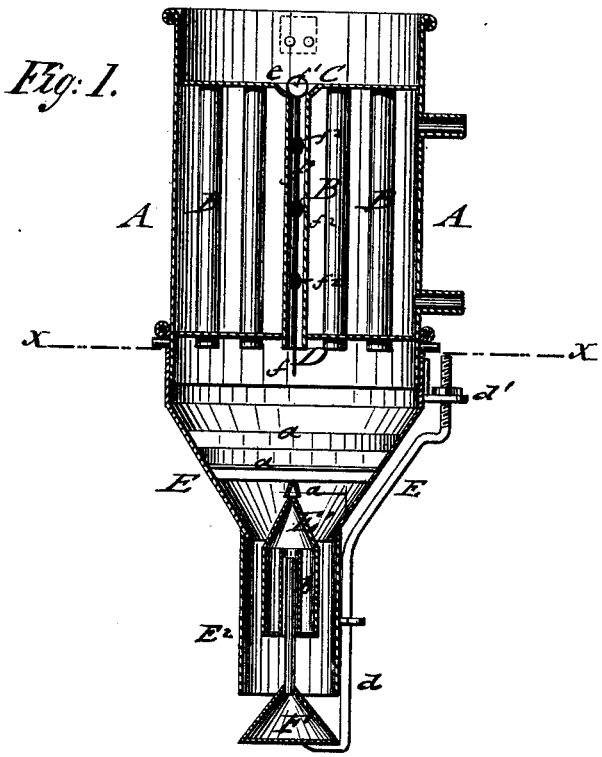
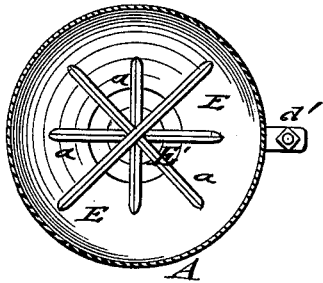
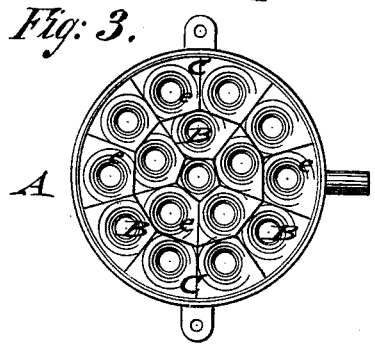
WITNESSES:
Achilles Schehl
C. Sedgwick
INVENTOR:
P. Provost
BY Munn & Co
ATTORNEYS.

UNITED STATES PATENT OFFICE.

PETER PROVOST, OF MINNEAPOLIS, MINNESOTA.

IMPROVEMENT IN GRAIN-DRIERS.

Specification forming part of Letters Patent No. 214,189, dated April 8, 1879; application filed November 15, 1878.

*To all whom it may concern:*

Be it known that I, PETER PROVOST, of Minneapolis, in the county of Hennepin and State of Minnesota, have invented a new and Improved Grain-Drier, of which the following is a specification.

In the accompanying drawings, Figure 1 represents a vertical central section of my improved grain-drier; Fig. 2, a horizontal section on line $x\ x$, Fig. 1; and Fig. 3, a top view of the same.

Similar letters of reference indicate corresponding parts.

The object of this invention is to so improve the grain-drier for which Letters Patent have been granted to me dated May 21, 1878, and numbered 203,933, that the grain may be passed through the same in more uniform manner, at greater or less speed, and may be exposed to the proper degree of heat in its passage through the drier; and the invention consists of a cylindrical drier, having vertical tubes and a bottom exit-funnel, with an interior deflecting-cone for regulating the flow of wheat in connection with an adjustable conical bottom valve, that is guided by its stem in a central tube of the deflecting-cone. The tubes are provided with detachable wires, having an eye at the top and equidistant balls, by which the position of the grain is changed in its passage through the tube. The top plate of the drier is made with concave depressions around each tube, so as to take up an even quantity of grain for each tube.

Referring to the drawings, A represents the exterior sheet-metal cylinder of my improved grain-drier, which is arranged with a number of interior vertical tubes, B, that are supported by a top head, C, and by a bottom plate, D, the tubes extending slightly below the latter. The steam is supplied to the space around the tubes, between the top head and bottom plate, by a top supply and bottom discharge pipe, with steam-cocks, so that the grain that passes from a top hopper through the tubes to the burr-stones is heated up to the proper degree of dryness for grinding.

The bottom E of the drier is either permanently or detachably applied to the lower part of the cylinder A, and made in the shape of a funnel, with a number of beveled cross-bars, $a$, that break the fall of the wheat as it is discharged from the tubes, and that also prevent it from escaping too rapidly through the funnel.

To the lowermost cross-bar, $a$, is attached a conical deflecting-cone, $E^1$, which extends by a cylindrical portion into the discharge-tube $E^2$, below the funnel. The deflecting-cone $E^1$ regulates the flow of wheat through the tubes, so that it passes through all the tubes at the same speed, without moving faster in one and slower in the other.

A central guide-tube, $b$, of the deflector-cone $E^1$ serves to guide the stem of a conical bottom valve, F, which may be adjusted by a guide-rod, $d$, and screw-nut $d^1$ higher or lower, so as to more or less open or close the mouth of the exit-tube $E^2$. The conical valve F regulates the speed by which the wheat is passed through the drier, according to the condition of the same, either fast or slow, as the valve is farther below or nearer to the mouth of the exit-tube.

The top head C of the cylinder A is made with a number of concave depressions, $e$, one around each tube B, as shown in Fig. 3, so that each tube takes up about the same quantity of wheat without allowing any one of the kernels to remain exposed to the heat for any great length of time, so as to get scorched or burned. Within each tube B is placed a wire, $f$, which rests by an eye, $f^1$, at the upper end on the concave depression of the head, and assumes thereby a position in the center of the tube. Each wire $f$ is provided with three or more small balls, $f^2$, at equal distances from each other, which serve to change the position of the grain as it passes through the tubes, so as to expose it more perfectly to the heating action of the steam. The balls also retard somewhat the flow of the wheat, and serve to control, in connection with the deflecting-cone and regulating-valve, the speed by which the wheat passes through the drier, so as to expose the grain to the proper degree of heat during its passage through the drier.

Having thus fully described my invention, I claim as new and desire to secure by Letters Patent—

1. The combination, with the tubes B, through which the grain passes while being heated, of the subjacent funnel E, provided with beveled cross-bars $a$, at different heights, and a deflector, $E^1$, depending from the lowest of said cross-bars, as and for the purpose described.

2. The combination, with the discharge-spout $E^2$, of a conical valve, F, having a stem movable up and down in an inner tube of the cylindrical part of deflector $E^1$, as and for the purpose set forth.

3. The combination, with the grain-tubes B, of the wires $f$, each provided with several balls, arranged at intervals thereon, as and for the purpose specified.

4. The wires $f$, centered in the tubes B by means of the eyes $f^1$ on the wires, and the conical depressions in the upper part of tubes B, as shown and described.

5. In a grain-drier, the top head having concave depressions around each conducting-tube, to supply an equal quantity of grain thereto, substantially as described.

PETER PROVOST.

Witnesses:
J. H. RANDALL,
J. W. BIRDWELL.